(12) United States Patent
Kopp et al.

(10) Patent No.: US 10,352,433 B2
(45) Date of Patent: Jul. 16, 2019

(54) DEVICE FOR CONDITIONING THE LUBRICATING OIL OF A TORQUE TRANSMISSION DEVICE

(71) Applicant: AUDI AG, Ingolstadt (DE)

(72) Inventors: Andreas Kopp, Kösching (DE); Riccardo Parenti, Calderara di Reno (IT)

(73) Assignee: AUDI AG, Ingolstadt (DE)

( * ) Notice: Subject to any disclaimer, the term of this patent is extended or adjusted under 35 U.S.C. 154(b) by 166 days.

(21) Appl. No.: 15/328,953

(22) PCT Filed: Jul. 22, 2015

(86) PCT No.: PCT/EP2015/066760
§ 371 (c)(1),
(2) Date: Jan. 25, 2017

(87) PCT Pub. No.: WO2016/012498
PCT Pub. Date: Jan. 28, 2016

(65) Prior Publication Data
US 2017/0211684 A1    Jul. 27, 2017

(30) Foreign Application Priority Data
Jul. 25, 2014 (DE) .................. 10 2014 011 096

(51) Int. Cl.
*F16H 57/04* (2010.01)
*H05B 3/82* (2006.01)

(52) U.S. Cl.
CPC ..... *F16H 57/0413* (2013.01); *F16H 57/0409* (2013.01); *F16H 57/0457* (2013.01);
(Continued)

(58) Field of Classification Search
CPC ............ F16H 57/0413; F16H 57/0409; F16H 57/0457; F16H 57/0493; F16H 57/0417;
(Continued)

(56) References Cited

U.S. PATENT DOCUMENTS

2011/0155714 A1    6/2011    Thomas et al.

FOREIGN PATENT DOCUMENTS

| CN | 101617103 A | 12/2009 |
|---|---|---|
| CN | 201714953 U | 1/2011 |

(Continued)

OTHER PUBLICATIONS

Transmittal of the Translation of the International Preliminary Report on Patentability dated Feb. 9, 2017, in connection with corresponding International Application No. PCT/EP2015/066760, filed Jul. 22, 2015 (8 pgs.).

(Continued)

*Primary Examiner* — Shawntina T Fuqua
(74) *Attorney, Agent, or Firm* — Maier & Maier, PLLC

(57) ABSTRACT

A device for conditioning the lubricating oil of a torque transmission device for motor vehicles, in particular for gear transmissions, in which the lubricating oil is heated at least temporarily in the cold state in order to reduce friction and/or churning losses. For an improved reduction in the losses in the cold running range, it is proposed that at least one heating element be disposed directly in the oil-lubrication flow of the transmission elements.

14 Claims, 5 Drawing Sheets

(52) U.S. Cl.
CPC .......... *F16H 57/0493* (2013.01); *H05B 3/82* (2013.01); *H05B 2203/021* (2013.01)

(58) Field of Classification Search
CPC ............... F16H 57/0416; F16H 57/042; F16H 57/0427; F16H 57/0428; F16H 57/043; F16H 57/0431; H05B 3/82; H05B 2203/027; H05B 3/0042; H05B 2203/021; H05B 2203/023; H05B 1/0236
See application file for complete search history.

(56) References Cited

FOREIGN PATENT DOCUMENTS

| | | |
|---|---|---|
| CN | 102211557 A | 10/2011 |
| CN | 203230541 U | 10/2013 |
| DE | 907724 C | 3/1954 |
| DE | 31 16 595 A1 | 11/1982 |
| DE | 19923184 C1 | 3/2000 |
| DE | 19847533 A1 | 4/2000 |
| DE | 10016640 C1 | 9/2001 |
| DE | 101 36 171 A1 | 2/2003 |
| DE | 10332497 A1 | 2/2005 |
| DE | 102008020646 | * 10/2009 |
| DE | 102008020646 A1 | 10/2009 |
| DE | 10 2008 057 510 A1 | 5/2010 |
| EP | 0 623 767 A1 | 11/1994 |
| EP | 0785379 | * 7/1997 |
| EP | 0785379 A2 | 7/1997 |
| JP | H09-209734 A | 8/1997 |

OTHER PUBLICATIONS

European Examination Report dated Jul. 31, 2018 in corresponding European Application No. 15 741 985.4; 5 pages.
Chinese Office Action dated Apr. 26, 2018, in connection with corresponding Chinese Application No. 201580040838.6 (8 pgs.).
German Office Action dated Jun. 9, 2015 of corresponding application No. DE10 2014 011 096.6; 1 pg.
International Search Report and Opinion dated Nov. 24, 2015 of corresponding application No. PCT/EP2015/066760; 12 pgs.
German Office Action dated Mar. 16, 2015 of corresponding application No. DE10 2014 011 096.6; 7 pgs.

* cited by examiner

DEVICE FOR CONDITIONING THE LUBRICATING OIL OF A TORQUE TRANSMISSION DEVICE

BACKGROUND

The invention relates to a device for conditioning the lubricating oil of a torque transmission device for motor vehicles of the introductory portion of claim 1.

Motor vehicle transmissions and differentials are lubricated at the front axle as well as at the rear axle by means of oils, especially transmission oils. The oil has different tasks here: partly, it is used to activate control elements for the transmission of force (torque converters), for lubricating mutually contacting tooth flanks and for transporting heat within the transmission. The oils wet the metallic surfaces and the corresponding contact surfaces of the gear pairings in the transmission. By these means, cold welding of the contact surfaces is prevented. Accordingly, it is important to bring sufficient oil to the corresponding mutually contacting tooth flanks. For oil bath-lubricated transmissions, one or more gearwheels is/are in the so-called oil sump. With the combing of gear wheels in this oil sump, oil is conveyed and, in this way, reaches the mutually contacting tooth flanks. Due to the meshing of the gear wheels in the oil and due to oil squeezing losses, churning losses occur here in the regions, in which the different gear wheels mesh. This is caused by oil being pushed away at the tooth flanks and the interstices of the teeth.

The DE 10 2008 057 510 A1 discloses a generic device, for which the transmission oil of a change-speed gearbox with an integrated differential is heated in order to reduce the frictional and churning losses of the transmission element, particularly in the cold state of the transmission oil. The ring-shaped heating element is disposed about the gear shaft in such a manner, that it protrudes partly into the oil sump of the transmission and, in addition, is wetted by the oil sprayed by an adjacent gear wheel. As with other known devices, the most efficient heating effect is intended to heat all of the transmission oil in the oil sump.

SUMMARY OF THE DISCLOSURE

It is an object of the invention to propose a device of the generic type, which enables a particularly rapid decrease in friction and/or churning losses in torque transmission devices, while the engineering construction is kept simple.

This objective is accomplished by the features listed in claim 1. Further advantageous developments of the device are the subject matter of the dependent claims.

The invention is based on the fact that the previously addressed churning and squeezing losses arise through direct contact between the oil and the gear wheel. The basic concept of the invention consists of bringing one or more intermittent heating elements or also panel heating systems into the oil-lubrication flow at the gear wheels. By these means, the heat generated by the heating elements is carried along because of the ensuing forced flow of the combing gear wheels in the oil. A pump is not necessary to transport the heat. Furthermore, the actual region of the oil-lubrication flow, which is responsible for the churning losses, can be heated purposefully, highly efficiently and quickly. The churning losses are decreased due to the rise in temperature of the oil in the region of the gear wheel.

Accordingly, the thin, low viscosity oil is, moreover, carried over the teeth to the gear wheel connections and the churning losses are thus reduced. Since, additionally, the volume of the heated flow of lubricating oil is relatively small in comparison to the whole of the oil space, this idea, in comparison to the prior art, represents a very efficient energy-saving system for improving the thermal efficiency of transmissions.

Against this background, at least one heating element is disposed directly in the oil-lubricant flow of the transmission elements according to the characterizing portion of claim 1. By the appropriate arrangement of the at least one heating element, the invention aims to heat only the lubricating flow at the transmission element directly and not the lubricating oil in general; accordingly, the heating acts locally, directly on the transmission element and it decreases frictional and/or churning losses quickly and effectively here. In particular, a change-speed gear box or gear drives of any construction, differential transmissions, torque converters, etc., are to be understood here as torque transmission devices.

For the improved entry of heat within the forced flow of oil, a component, which conducts heat well and through the help of which a uniform distribution of heat within the oil-lubricant flow takes place, may also be mounted around the operating heating element. This idea is applicable to all transmissions and differentials.

In addition, by means of an appropriately timed or a low supply of energy to the heating element, the oil may be heated even when the transmission is stationary. This is particularly advantageous, especially for plug-in drive systems, in order to ensure an efficiency-optimized operation of the transmission already when starting up and especially at low temperatures of the transmission oil.

A further embodiment for the targeted reduction of squeezing losses can be as described below for transmissions with a dry sump. For dry sump transmissions, the transmission oil is pumped from the sump of collected oil into, for example, a higher tank (collection space). The oil then drips from above through appropriately located openings onto the gear pairs and lubricates the mutually meshing tooth flanks. Admittedly, for this type of lubrication, the churning losses are reduced by lowering the oil sump; however, the squeezing losses at the two flanks are retained. The idea here once again is to use the forced oil flow, this time one caused by gravity, and to mount one or more heating elements, for heating the descending oil, in the collecting space and to reduce the viscosity of the dripping oil accordingly. By these means, the squeezing losses at the mutually meshing gear wheels are reduced decisively. Alternatively, the collection space may also be provided with heating lances, along which the oil runs down, simultaneously heats up and then drips onto the corresponding lubrication points.

Individual aspects of the invention are emphasized once again in detail in the following. Preferably, for gear transmissions with at least one transmission element dipping into an oil sump, the heating element may be positioned in the flowing oil (lubrication flow) necessarily forming in the oil sump about the transmission element. In particular, the heating element may be disposed in the region in which the transmission element is immersed in the oil sump, as a result of which the oil, which is heated by the heating element, is transported efficiently to the transmission element along and directly into the engagement areas. As a result, a separate pump may be omitted.

Moreover, it is proposed that, for a gear transmission with a gear wheel immersed in the oil sump and with a defined radius R, the heating element be positioned within a distance of 1.3×R and especially of 1.15×R, in order to ensure that the heat is brought effectively into the flowing transmission oil. The distance of 1.3×R defines the region, up to which churning losses may have an impact and which is consequently particularly relevant for local heating of the transmission oil.

In the technical literature (see the dissertation of Dipl.-Eng. Dirk Strasser Bochum 2005 and the Mauz/M2 publications), the circulating region or oil-lubrication flow about the teeth of a gear wheel, relevant for the churning effect, is defined in the region up to 1.3×R. Here, R is the radius of the gear wheel dipping into the oil sump. Accordingly, it is particularly relevant to accommodate the heating elements within this radial gap of the immersed gear wheels.

Furthermore, it is particularly preferred if the at least one heating element is heated electrically until a defined operating temperature of the lubricating oil is reached; the rapidly starting, electrical heating is effectively possible, because the heat capacity, available for a structurally simple design of the heating element can be brought only into the direct flow of lubricating oil at the transmission element, the whole of the oil sump being heated only secondarily.

In an advantageous embodiment of the invention, one or more heating elements may be provided for differential transmissions of motor vehicles (for example, at the front and/or rear axle) with a gear wheel dipping into an oil sump as well as for change-speed gear boxes with gear sets dipping into an oil sump, as described above.

In a structurally particularly simple design, the heating elements may be formed by heating rods, which dip into the oil sump and act essentially intermittently.

In an alternative design of the invention, the heating element may be formed by flat, streamlined heating bodies in the oil-lubrication flow. These may be formed preferably by guide vanes, curved parallel to the direction of the oil flow and extending over a peripheral region of the immersed transmission element and, as seen in cross section, they may have a fluidynamically favorable airfoil.

The invention is not limited to torque transmission devices with an oil sump; for example, for a gear drive with dry sump lubrication and at least one oil lubrication device above the transmission elements, which supplies transmission oil to the transmission elements in the engagement area, the at least one heating element is disposed directly at the supplying device. For such transmissions, admittedly churning losses essentially do not occur. However, the cold, viscous lubricating oil brings about squeezing or frictional losses in a known manner in the engagement regions and these losses can be reduced selectively by the rapidly starting, local heating of the lubricating oil directly in the oil lubrication flow or at the supplying device.

In particular, the supplying device may be an oil pipeline, which branches off from an oil collection space above the transmission elements and is constructed as an electric heating element.

Finally, in a structurally especially simple design, the oil pipeline may be constructed as a heating lance, along which the lubricating oil supplied flows downward due to gravity and, above the engagement region of the transmission elements, drips onto the latter.

BRIEF DESCRIPTION OF THE DRAWINGS

Several embodiments of the invention are explained in greater detail in the following with reference to the appended drawings, in which

DETAILED DESCRIPTION OF THE DRAWINGS

Figure 1:
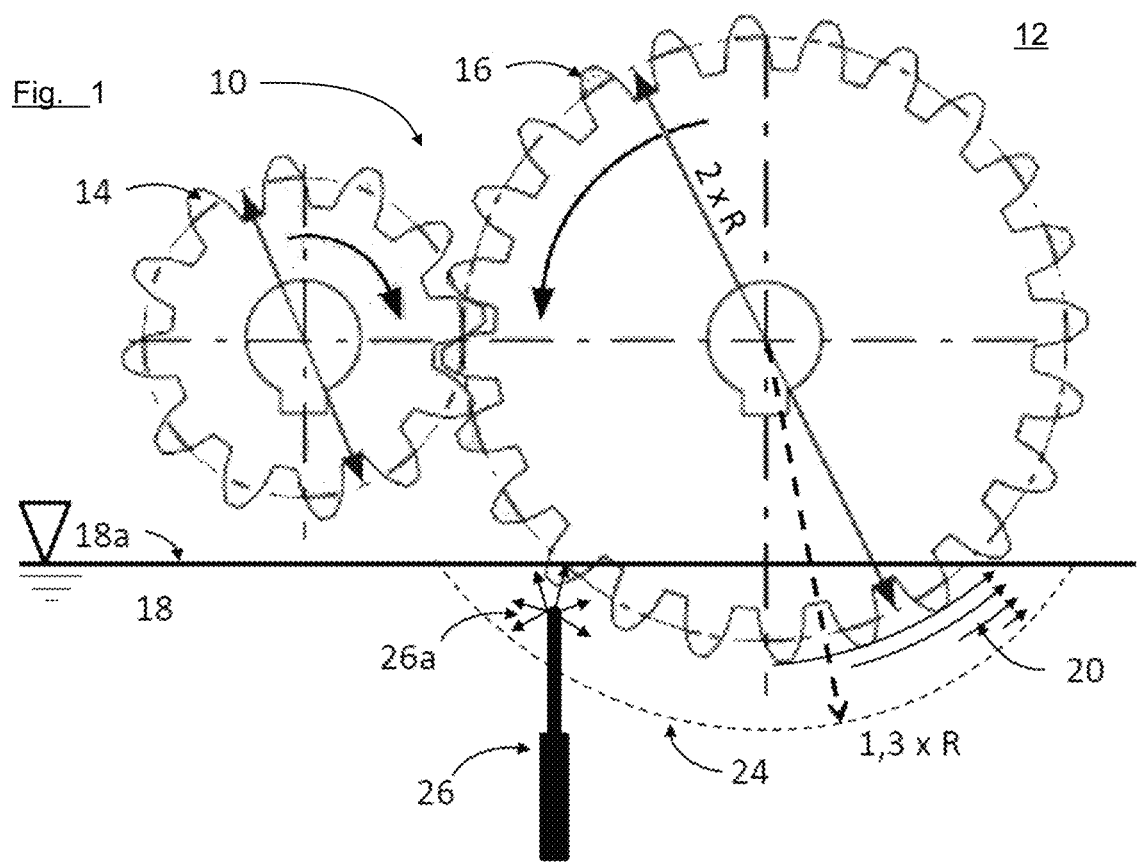
Figure 2:
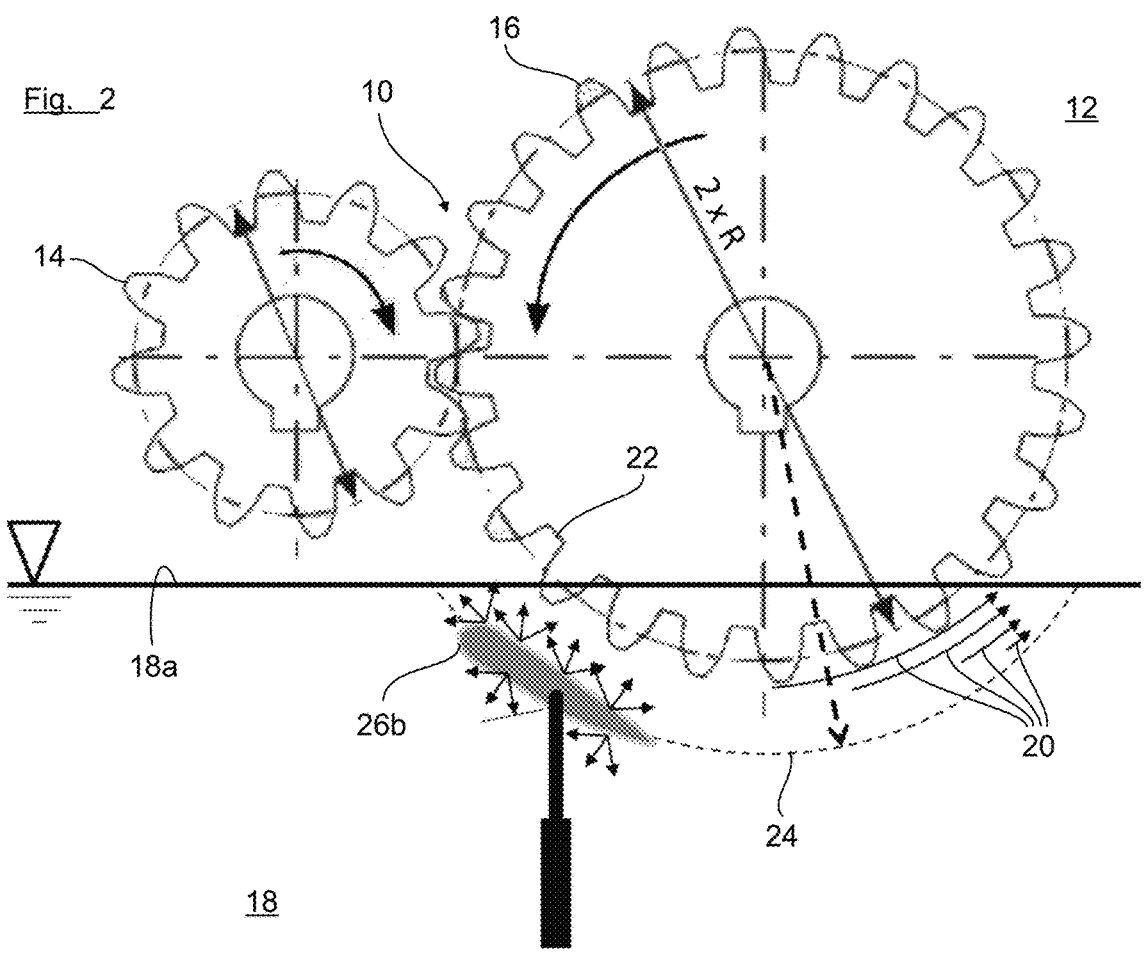
Figure 3:
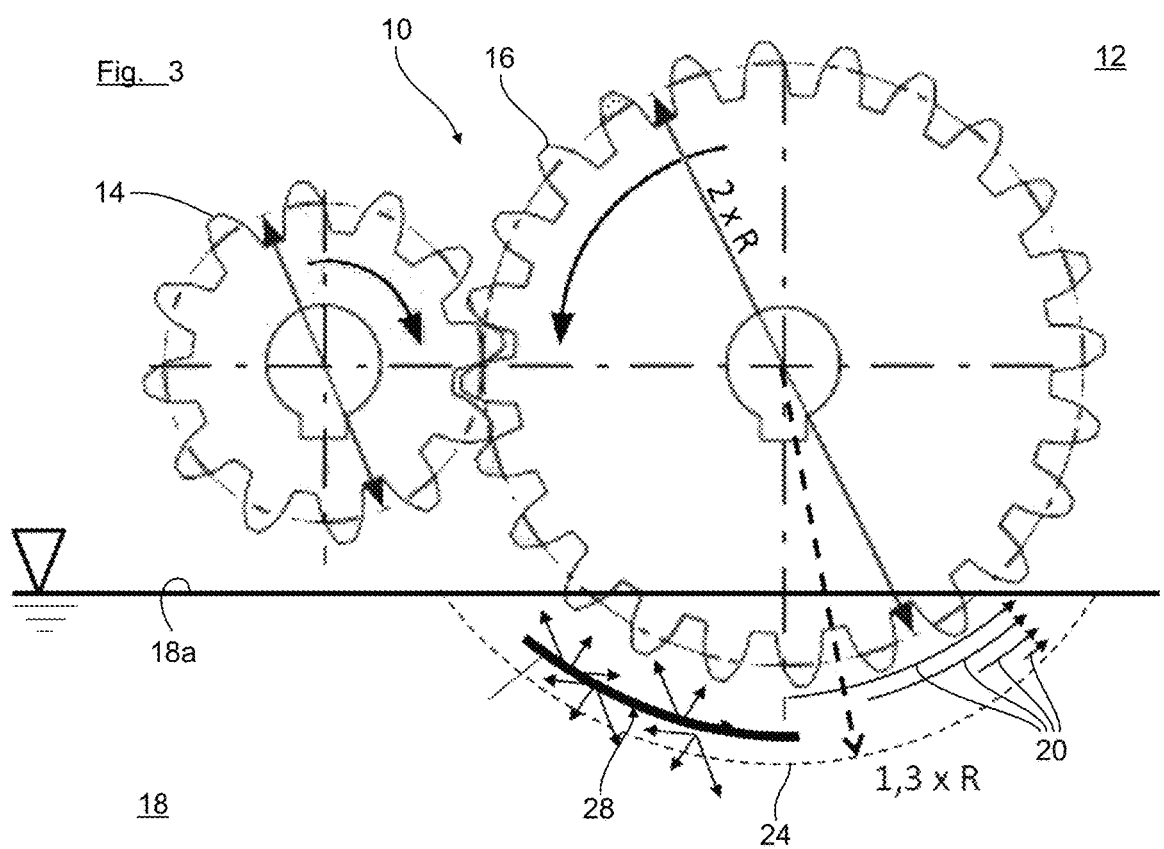
Figure 4:
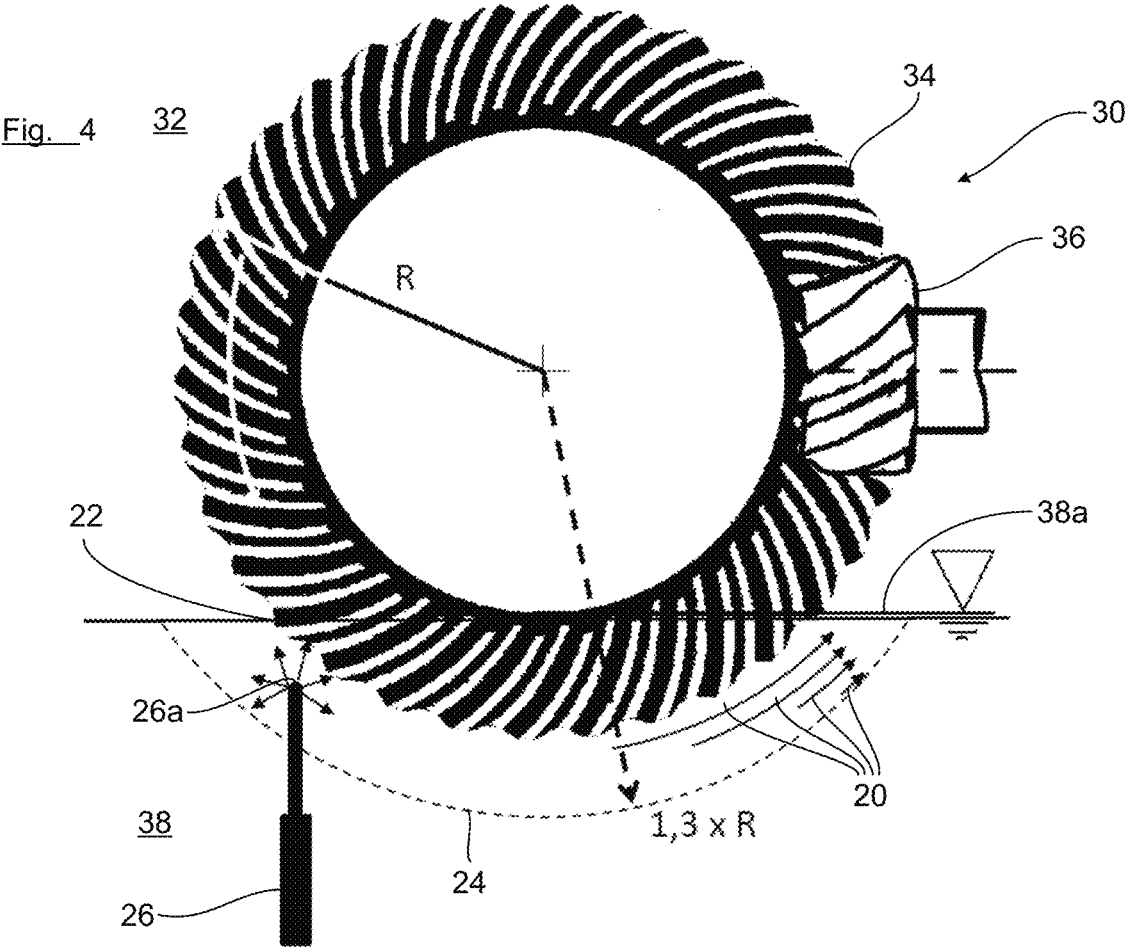
Figure 5:
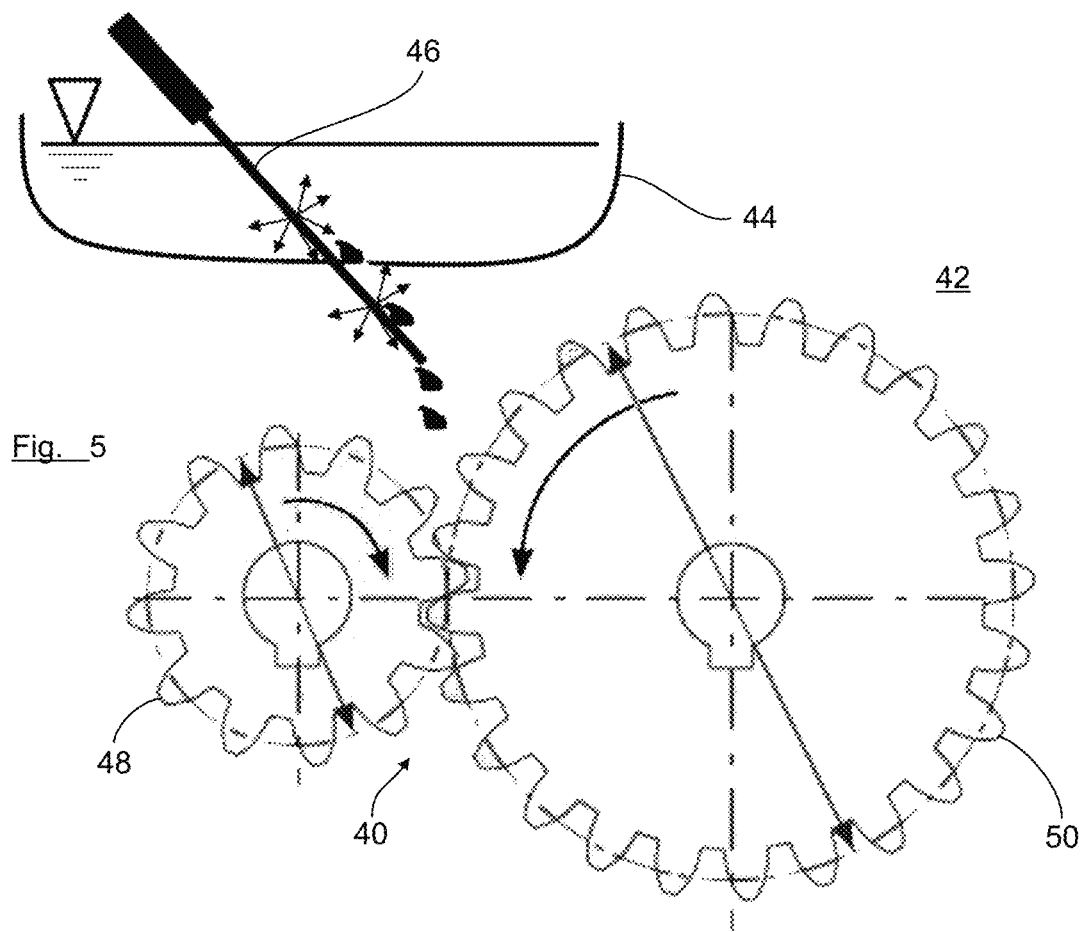

FIG. 1 shows a cross-section through a set of gears of a change-speed gear box for motor vehicles with a gear wheel, which dips into an oil sump and at the immersion region of which an electrical heating rod is provided as a device for locally heating the transmission oil in the oil-lubrication stream;

FIG. 2 shows the device of FIG. 1 with a flat heating element constructed in cross-section as an airfoil;

FIG. 3 shows an alternate design of the device of FIG. 1 with a guide vane, which is curved parallel to the immersed peripheral section of the gear wheel, as heating element;

FIG. 4 shows the crown gear with drive pinions of a bevel gear axle differential for motor vehicles with a heating element for the local heating of the transmission oil, disposed in the immersion region of the crown gear in an oil sump; and FIG. 5 shows an arrangement of the device for locally heating the transmission oil at a gear drive of a gear box for motor vehicles with dry sump lubrication.

In FIG. 1, a torque transfer device or a gear drive 10 is shown only as far as required for understanding the present invention, with two gear wheels 14, 16, which mesh with one another and are mounted rotatably in a transmission housing 12 and of which the larger gear wheel 16 protrudes to a defined immersion depth into an oil sump 18 in the transmission housing 12.

The gear transmission 10 may, for example, be a primary reduction or a gear set of a change-speed gear box (manual transmission) for motor vehicles.

The level 18a of the oil sump 18, formed by the transmission oil (or a different lubricant) is designed so that the immersed gear wheel 16 carries along sufficient transmission oil and that, among other things, the contact regions of the torque-transferring teeth of the gear wheel 14, 16 are lubricated adequately.

Aside from the thereby resulting squeezing and friction losses especially in the case of a viscous, cold transmission oil, churning losses for the gear wheel 16 arise in the oil sump 18 and, as indicated by flow arrows 20, an oil-lubrication flow is formed which, for a regular direction of rotation of the gear drive 10 or the gear wheel 16, lies between the immersion point at 22 and the exiting of the teeth of the gear wheel 16 and decreases increasingly radially away from the gear wheel 16.

In FIG. 1, the relevant area of the oil-lubrication flow, which causes the churning losses, is bounded by the broken line 24 and amounts to about 1.3×R of the gear wheel 16.

In the transmission housing 12 of the gear wheel drive 10, a heating element or an electrical heating rod 26 is inserted, the selectively heated tip 26a of which protrudes in the vicinity of the immersion point 22 with a distance of 1.15×R or approximately centrally into the oil-lubrication flow bounded radially by the line 24.

The heating rod 26, the construction of which may be of any conventional, commercial type, is controlled electrically at temperatures below a defined operating temperature of the transmission oil and, in the region below the line 24, locally heats the transmission oil in such a manner that frictional, squeezing and churning losses are decreased by the rapid heating of the oil and the effectiveness of the transmission 10 is increased.

FIGS. 2 and 3 show alternative designs of the heating element of the gear drive 10, which otherwise is unchanged. Functionally identical parts have been provided with identical reference numbers.

In accordance with FIG. 2, a thermally conducting, flat heating body 26b is attached to the tip 26a of the heating rod 26' and, seen in cross-section, is constructed as a streamlined airfoil (or in droplet form) and may, for example, correspond in width to that of the gear wheel 16. The increase in surface area of the heating element 26' achieved in this manner can ensure an even faster local heating of the transmission oil within the oil-lubrication flow or within the region of 1.3×R (line 24) at the gear wheel 15.

For the gear drive 10 in FIG. 3, an electrical heating element in the form of a guide vane 28 is used instead of the heating element 26 and is fixed approximately stationary and extends parallel and over a defined peripheral region of the gear wheel 16 immersed in the oil sump 18 and also positioned, as described in FIG. 1, in the oil-lubrication flow within the line 24.

FIG. 4 shows a further example of the invention by means of an only partially shown differential transmission 30 for motor vehicles. The differential transmission 30 may, for example, be a well-known bevel-gear differential, the gear wheel or crown gear 34 of which, pivoted in a differential housing 32, can be driven over a drive pinion 36.

In order to lubricate the tooth system between the crown pinion 34 and the drive pinion 36 (and other drive elements), the crown pinion 34 dips into an oil sump 38, which is formed in the differential housing 32, and filled to a height of 38a.

As previously described in connection with FIG. 1, once again an oil-lubrication flow is formed, which extends from the immersion point 22 of the crown pinion 34 to the outlet point and has an effect approximately at a radial distance of 1.3×R of the crown pinion 34.

As in FIG. 1, a stationary heating element or a stationary heating rod 26, by means of which the transmission oil in the oil-lubrication flow can be heated intermittently, is inserted in the region bounded by the line 24 and in the vicinity of the immersion point 22.

According to FIG. 2, the heating rod 26 may also be constructed in combination with a heating body 26b or, according to FIG. 3, as a guide vane 28.

Finally, FIG. 5 shows an example of the invention at a gear drive 40, for example, for a change-speed gearbox (or, for example, a control drive for internal combustion engines) of motor vehicles with a known dry sump lubrication for avoiding churning losses at the transmission elements.

In this connection, the lubricating oil is aspirated constantly from the transmission housing 42 and pumped into a geodesically higher supply device with a collecting tank 44.

From here, the lubricant oil can be supplied over at least one supply line 46 to the lubricating sites or the area here where the gear wheels 48, 50 engage the gear drive 40.

The supply line 46 is constructed as a heating element, especially as an electrically heating lance, along which the lubricating oil can flow from the collecting tank 44 and finally drip down over said region of tooth engagement.

Once again, the lubricating oil is heated locally in the oil-lubrication flow (along the heating lance 46) to the gear wheels 48, 50 and brings about rapid and efficient heating of the lubricating oil, especially of cold, viscous lubricating oil, or a reduction in the squeezing and frictional losses in the gear drive 40.

Instead of the described heating lance 46, a heatable oil pipeline, etc., could also be provided. Furthermore, for several gear sets 48, 50 and/or for supplying other lubricating sites, correspondingly many electrically heatable supply lines 46, originating from the collecting tank 40, may be provided.

In addition, by means of an appropriately timed or a low supply of energy to the at least one heating element, the lubricating oil may be heated even when the torque transmission device is stationary. This is particularly advantageous for plug-in drive systems of hybrid vehicles, which are charged from a power supply in order to ensure an efficiency-optimized operation of the torque transmission device already when starting up especially at low outside temperatures.

The invention claimed is:

1. A device for conditioning lubricating oil of a torque transmission device for motor vehicles, comprising:
    at least one heating element arranged directly in an oil-lubrication flow of one or more transmission elements,
    wherein the lubricating oil is heated at least temporarily in a cold state by the at least one heating element in order to reduce friction and churning losses at the one or more transmission elements of the torque transmission device at least temporarily,
    one transmission element has a defined radius R, and
    the oil-lubrication flow is defined by a region up to 1.3×R.

2. The device according to claim 1, wherein at least one transmission element is immersed in an oil sump, R is the radius of the at least one transmission element dipping into the oil sump, and the at least one heating element is positioned in the oil-lubrication flow forming in the oil sump.

3. The device according to claim 2, wherein the at least one heating element is disposed proximate an immersion region of the at least one transmission element in the oil sump.

4. The device according to claim 2, wherein the at least one heating element is positioned within an interval of approximately 1.15×R.

5. The device according to claim 1, wherein the at least one heating element is heated electrically until a defined operating temperature of the lubricating oil is reached.

6. The device according to claim 1, wherein the at least one heating element is provided for a differential transmission for motor vehicles with a gear wheel immersed in an oil sump.

7. The device according to claim 1, wherein a plurality of heating elements are used at different gear stages of a change-speed gearbox for motor vehicles.

8. The device according to claim 2, wherein the at least one heating element is formed by heating rods, which protrude into the oil sump and act intermittently.

9. The device according to claim 1, wherein the at least one heating element is constructed as a flat heating body, which lies in the oil-lubrication flow.

10. The device according to claim 1, wherein the at least one heating element is formed by a guide vane, which is curved parallel to the direction of the oil-lubrication flow and extends over a peripheral region of the one or more transmission elements.

11. The device according to claim 9, wherein the flat heating body is constructed in cross-section as an airfoil.

12. The device according to claim 1, wherein, for a gear transmission with dry sump lubrication and at least one oil-lubrication device above the transmission elements, which supplies transmission oil to the transmission elements in the engagement area, the at least one heating element is disposed directly at the supplying device.

13. The device according to claim 12, wherein the supplying device is an oil pipeline, which branches off from an oil collecting space above the transmission elements, and which is constructed as an electrical heating element.

14. The device according to claim 13, wherein the oil pipeline is constructed as a heating lance along which the supplied lubricating oil flows and drips off above the engagement region of the transmission elements.

* * * * *